J. M. KOZIOL.
HUSKING HOOK.
APPLICATION FILED APR. 22, 1921.
1,388,580.   Patented Aug. 23, 1921.
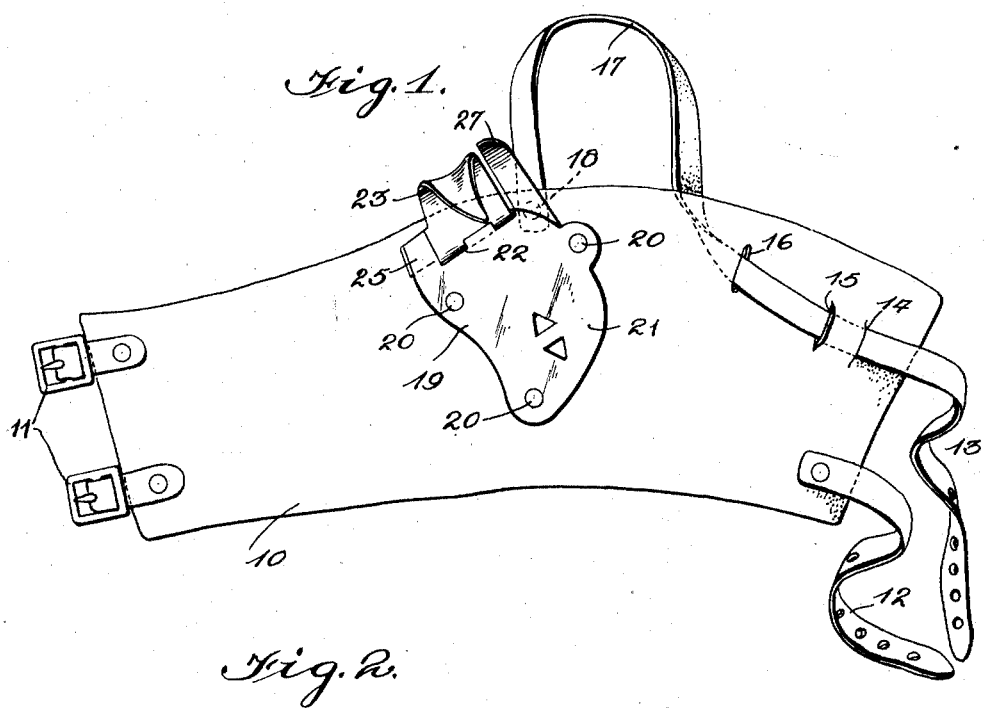
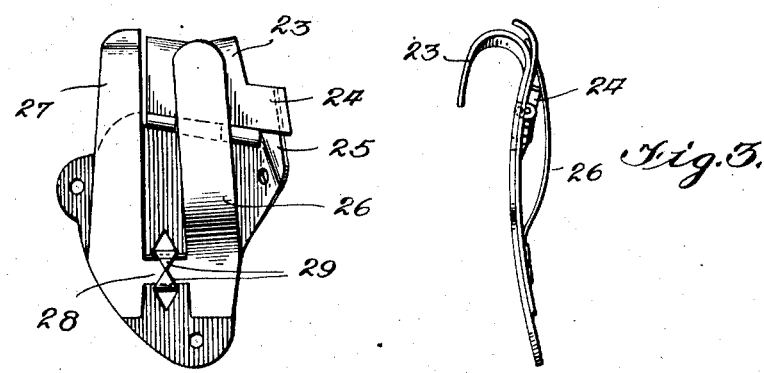
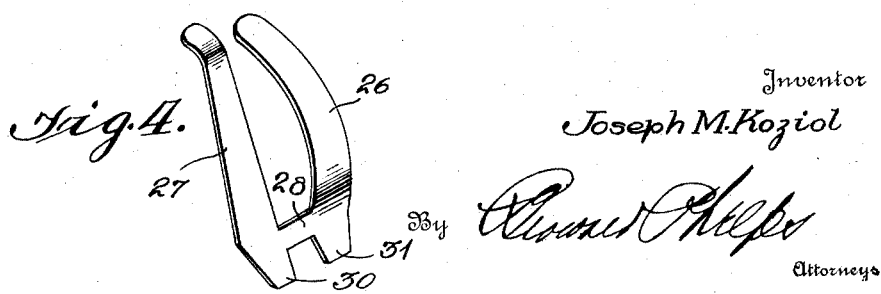
Inventor
Joseph M. Koziol

UNITED STATES PATENT OFFICE.

JOSEPH M. KOZIOL, OF PENDER, NEBRASKA.

HUSKING-HOOK.

1,388,580.   Specification of Letters Patent.   Patented Aug. 23, 1921.

Application filed April 22, 1921. Serial No. 463,649.

*To all whom it may concern:*

Be it known that I, JOSEPH M. KOZIOL, a citizen of the United States, residing at Pender, in the county of Thurston and State of Nebraska, have invented certain new and useful Improvements in Husking-Hooks, of which the following is a specification.

This invention relates to husking hooks and has as an object the provision of an improvement on my former Patent No. 1,179,843, dated April 18, 1916.

The improvement comprises a more simple construction of the hook and a more simple means of fastening the portions of the hook together than that shown in the former patent. An illustrative embodiment of the invention is shown in the accompanying drawing, in which—

Figure 1 is a front view of the assembled device;

Fig. 2 is a rear view of the hook plate;

Fig. 3 is a side view of the structure shown in Fig. 2;

Fig. 4 is a perspective view of the spring member segregated from the hook plate.

To hold the hook upon the hand of the user a flexible band 10 is provided with buckles 11 and straps 12, 13. Strap 13 is shown as passed through slits at 14, 15 and 16, then formed into a loop 17, the end thereof being secured to the band 10 as by a rivet at 18.

The hook plate 19 may be secured to the band 10 as by rivets 20. The hook plate comprises a body portion 21 having hinged thereto at 22 a hook member 23. The hook member 23 in addition to its hook carries a stop member 24 formed integral therewith and projecting laterally therefrom. To co-act with the stop member 24 a projection 25 is formed on the plate 21. Preferably the stop 24 and the projection 25 are rearwardly deflected as indicated in Fig. 3 to remove them from the plane of the hinge, so that they shall not interfere with the action of the hook 23.

To resiliently press the hook member 23 against the stop projection 25 a spring 26, which may be bowed as shown in Fig. 3, is secured to the plate 21 and presses against the rear side of the hook.

It is desirable to have a knife for slitting of the husks beside the hook 23 and which knife is also preferably resilient. Such knife is shown at 27 and stands parallel with spring 26. To secure the springs 26 and 27 to the plate they are made integral with a cross member 28, which cross member is secured to the plate 21. As a means of securing this member to the plate 21 without weakening the same by rivet holes, tangs 29 are shown which are struck out from the middle of the plate 21 and bent about the transverse member 28, as clearly shown in Fig. 2. The projections 30, 31 of the members shown in perspective in Fig. 4, which projections extend below the transverse member 28, give a bearing for the spring action of the parts 26, 27 acting about the tangs 29 as the fulcrum to hold the resilient members rigid with the plate 21.

In operation the device is secured to the hand of the user with the thumb through the loop 17 and with the hook 23 and knife 27 lying upon the palm adjacent the wrist. By lateral motion the knife 27 is caused to slit the husks and the hook 23 is carried around the ear, separating the husks from the ear, which ear may then be grasped by the fingers of the hand of the operator upon which the device is carried. The resilience of the hook 23 allows the point to yield when pressed against the ear, so as not to dig in the kernels unduly. The same is true of the resiliency of the knife 27.

The members 26 and 27 comprising the entire resilient portion of the device being formed of a single piece of material can be produced much more cheaply than the form of the device shown in my former patent, and can also be assembled with the plate much more readily, and moreover provides a more efficient device for action.

Minor changes may be made in the physical embodiment of the invention without departing from the spirit thereof.

I claim—

1. A husking hook comprising, in combination, a member adapted to fit the hand, a plate carried by said member, a hook hinged to said plate, a bifurcated resilient member secured to said plate, one portion thereof providing a husk slitting knife and the other portion a spring to press said hook forwardly.

2. A husking hook comprising, in combination, a member adapted to fit the hand, a plate carried by said member, a hook hinged to said plate, a member projecting laterally from said hook, a stop member carried by said plate and standing in front of said member to limit the forward movement of the hook and resilient means pressing the hook forwardly.

3. A husking hook comprising, in combination, a plate adapted to be supported upon the hand, a hook hinged to said plate, a resilient bifurcated member comprising two portions connected by a transverse portion, ears struck out from said plate and bent about said transverse portion to secure said member to the plate with one of said portions standing behind said hook to resiliently press it forwardly and with the other standing beside the hook to provide a husk slitting knife.

In testimony whereof I affix my signature.

JOSEPH M. KOZIOL.